(12) United States Patent
Tian et al.

(10) Patent No.: US 12,463,547 B2
(45) Date of Patent: Nov. 4, 2025

(54) POWER SUPPLY, POWER SUPPLYING METHOD AND COMPUTER STORAGE MEDIUM

(71) Applicants: GUANGDONG OPPO MOBILE TELECOMMUNICATIONS CORP., LTD., Guangdong (CN); POWERLAND TECHNOLOGY INC., Jiangsu (CN)

(72) Inventors: Chen Tian, Guangdong (CN); Jialiang Zhang, Guangdong (CN); Jingpeng Zhu, Jiangsu (CN); Weiwei Lu, Jiangsu (CN); Juanjuan Sun, Jiangsu (CN); Julu Sun, Jiangsu (CN)

(73) Assignees: GUANGDONG OPPO MOBILE TELECOMMUNICATIONS CORP., LTD., Guangdong (CN); POWERLAND TECHNOLOGY INC., Jiangsu (CN)

( * ) Notice: Subject to any disclaimer, the term of this patent is extended or adjusted under 35 U.S.C. 154(b) by 188 days.

(21) Appl. No.: 18/311,201

(22) Filed: May 2, 2023

(65) Prior Publication Data
US 2023/0268843 A1    Aug. 24, 2023

Related U.S. Application Data

(63) Continuation of application No. PCT/CN2021/114120, filed on Aug. 23, 2021.

(30) Foreign Application Priority Data

Nov. 12, 2020    (CN) .................. 202011261778.X

(51) Int. Cl.
*H02M 7/06*    (2006.01)
*H02M 3/00*    (2006.01)
(Continued)

(52) U.S. Cl.
CPC ............... *H02M 7/06* (2013.01); *H02M 3/01* (2021.05); *H02M 3/33573* (2021.05);
(Continued)

(58) Field of Classification Search
CPC ...... H02M 1/007; H02M 1/42; H02M 1/4266; H02M 3/1582; H02M 3/01; H02M 3/33573; H02M 3/33592; H02M 7/06
See application file for complete search history.

(56) References Cited

U.S. PATENT DOCUMENTS 5,804,951 A * 9/1998 Rivet .................. H02M 1/4208
363/125
8,692,512 B2 * 4/2014 Tanikawa ................ B60L 58/20
320/109
(Continued)

FOREIGN PATENT DOCUMENTS

CA    3034422    8/2019
CN    1521928 A    8/2004
(Continued)

OTHER PUBLICATIONS

EPO, Extended European Search Report for EP Application No. 21890725.1, Mar. 4, 2024.
(Continued)

*Primary Examiner* — Gary L Laxton
(74) *Attorney, Agent, or Firm* — Hodgson Russ LLP

(57) ABSTRACT

A power supply, a power supplying method, and a computer-readable storage medium are provided. The power supply includes a rectifier circuit and a valley-fill circuit. The rectifier circuit is used for voltage transformation of an input AC voltage to obtain a first pulsating DC voltage. The valley-fill circuit includes at least one energy storage capacitor and is used for storing energy through the at least one energy storage capacitor when the first pulsating DC voltage
(Continued)

output by the rectifier circuit is in a first preset range and providing energy through the at least one energy storage capacitor when the first pulsating DC voltage output by the rectifier circuit is lower than a preset threshold, thereby to increase the valley voltage of the first pulsating DC voltage.

20 Claims, 6 Drawing Sheets

(51) Int. Cl.
*H02M 3/335* (2006.01)
*H02M 1/00* (2006.01)
*H02M 1/42* (2007.01)
*H02M 3/158* (2006.01)

(52) U.S. Cl.
CPC ........ *H02M 3/33592* (2013.01); *H02M 1/007* (2021.05); *H02M 1/42* (2013.01); *H02M 1/4266* (2013.01); *H02M 3/1582* (2013.01)

(56) References Cited

U.S. PATENT DOCUMENTS

| | | | |
|---|---|---|---|
| 9,118,185 B2* | 8/2015 | Von Novak | ....... H02J 7/007182 |
| 10,224,806 B1 | 3/2019 | Lind | |
| 2005/0270745 A1 | 12/2005 | Chen et al. | |
| 2013/0187595 A1 | 7/2013 | Bucher et al. | |
| 2014/0301119 A1 | 10/2014 | Chiang et al. | |
| 2017/0099710 A1 | 4/2017 | Liu | |
| 2017/0187217 A1 | 6/2017 | Gong et al. | |
| 2017/0294831 A1 | 10/2017 | Dai et al. | |
| 2018/0277999 A1 | 9/2018 | Hayes et al. | |

FOREIGN PATENT DOCUMENTS

| | | |
|---|---|---|
| CN | 103312144 | 9/2013 |
| CN | 103618461 | 3/2014 |
| CN | 204539569 | 8/2015 |
| CN | 106160479 A | 11/2016 |
| CN | 107769304 A | 3/2018 |
| CN | 109120156 | 1/2019 |
| CN | 109889062 A | 6/2019 |
| CN | 111262420 | 6/2020 |
| CN | 111771326 | 10/2020 |
| CN | 112234848 | 1/2021 |
| CN | 112448601 A | 3/2021 |
| EP | 3079252 A2 | 10/2016 |
| EP | 2393181 | 9/2019 |

OTHER PUBLICATIONS

CNIPA, Reexamination Decision for CN Application No. 202011261778.X, May 29, 2023.
CNIPA, Notification of Reexamination for CN Application No. 202011261778.X, Apr. 12, 2023.
CNIPA, First Office Action for CN Application No. 202011261778.X, Aug. 23, 2021.
CNIPA, Second Office Action for CN Application No. 202011261778.X, Feb. 7, 2022.
CNIPA, Decision of Rejection for CN Application No. 202011261778.X, Aug. 2, 2022.
WIPO, International Search Report and Written Opinion for PCT/CN2021/114120, Nov. 9, 2021.
CNIPA, First Office Action for CN Application No. 202011262842.6, Aug. 3, 2021.
CNIPA, Second Office Action for CN Application No. 202011262842.6, Dec. 17, 2021.
CNIPA, Desicion of Rejection for CN Application No.2 02011252842.6, Mar. 29, 2022.
WIPO, International Search Report for PCT Application No. PCT/CN2021/118072, Dec. 15, 2021.
CNIPA, Notification of Reexamination for CN Application No. 202011262842.6, Mar. 8, 2023.
CNIPA, Decision of Reexamination for CN Application No. 202011262842.6, May 6, 2023.
Vaalipour et al., "Electrolytic Capacitor-Less AC-DC LED Driver with Constant Output Current and PFC," The 6th Power Electronics, Driver Systems & Technologies Conference, IEEE, Feb. 3, 2015, pp. 107-112.
Fang et al., "Zero Ripple Single Stage AC-DC LED Driver with Unity Power Factor," 2013 IEEE Energy Conversion Congress and Exposition, IEEE, Sep. 15, 2013, pp. 3452-3458.
Ramakrishnareddy CH et al., "An efficient full-bridge resonant converter for light emitting diode (LED) application with simple current control," International Journal of Circuit Theory and Applications, Sep. 4, 2019, vol. 47, No. 12, pp. 2019-2031.
EPO, Extended European Search Report for EP Application No. 21890797.0, Apr. 2, 2024.
USPTO, Non-Final Office Action for U.S. Appl. No. 18/316,227, Jul. 2, 2025.

* cited by examiner

US 12,463,547 B2

POWER SUPPLY, POWER SUPPLYING METHOD AND COMPUTER STORAGE MEDIUM

CROSS-REFERENCE OF RELATED APPLICATIONS

This application is a continuation of International Application No. PCT/CN2021/114120, filed Aug. 23, 2021, which claims priority to Chinese Patent Application No. 202011261778.X, filed Nov. 12, 2020, the entire disclosures of which are incorporated herein by reference.

TECHNICAL FIELD

The disclosure relates to the field of power electronics, and more particularly to a power supply, a power supplying method, and a computer storage medium.

BACKGROUND

A power supply adapter, also known as an external power supply, is a power supply voltage conversion device for small-sized portable electronic devices and electronic appliances, which is generally applied to small-sized electronic products such as smart phones, mobile power supplies, liquid crystal display devices, and notebook computers.

At present, the power supply adapter receives an alternating current (AC) input voltage provided by a power grid, the AC input voltage is rectified by a rectifier bridge and then converted into a pulsating direct current (DC) voltage, and generally is further filtered by an electrolytic capacitor to obtain a DC voltage with small fluctuation. The electrolytic capacitor plays a role of storing energy by itself when the AC input voltage is relatively low to achieve of function of maintaining a stable output voltage. However, due to the electrolytic capacitor for energy storage with a relatively large capacity usually has a relatively large volume, which is not conducive to the realization of compact and lightweight design of the power supply adapter.

SUMMARY

Technical solutions of the disclosure are implemented as follows.

In a first aspect, an embodiment of the disclosure provides a power supply, including: a rectifier circuit, configured (i.e., structured and arranged) to perform voltage conversion on an input alternating current (AC) voltage to obtain a first pulsating direct current (DC) voltage; and a valley-fill circuit, including at least one energy storage capacitor and being configured to: store energy through the at least one energy storage capacitor when the first pulsating DC voltage output by the rectifier circuit is in a first preset range, and provide energy through the at least one energy storage capacitor to increase a valley voltage of the first pulsating DC voltage when the first pulsating DC voltage output by the rectifier circuit is lower than a preset threshold.

In a second aspect, an embodiment of the disclosure provides a power supplying method, including:
performing, by a rectifier circuit, voltage conversion on an input AC voltage to obtain a first pulsating DC voltage; and
controlling a valley-fill circuit to store energy through at least one energy storage capacitor in response to the first pulsating DC voltage output by the rectifier circuit being in a first preset range, and to provide energy through the at least one energy storage capacitor to increase a valley voltage of the first pulsating DC voltage in response to the first pulsating DC voltage output by the rectifier circuit being lower than a preset threshold; wherein the valley-fill circuit includes the at least one energy storage capacitor.

In a third aspect, an embodiment of the disclosure provides a non-transitory computer-readable storage medium. The computer-readable storage medium is stored with a computer program, and the computer program is configured (i.e., structured and arranged) to, when is executed, implement the method as described in the second aspect.

DETAILED DESCRIPTION OF EMBODIMENTS

Figure 1:
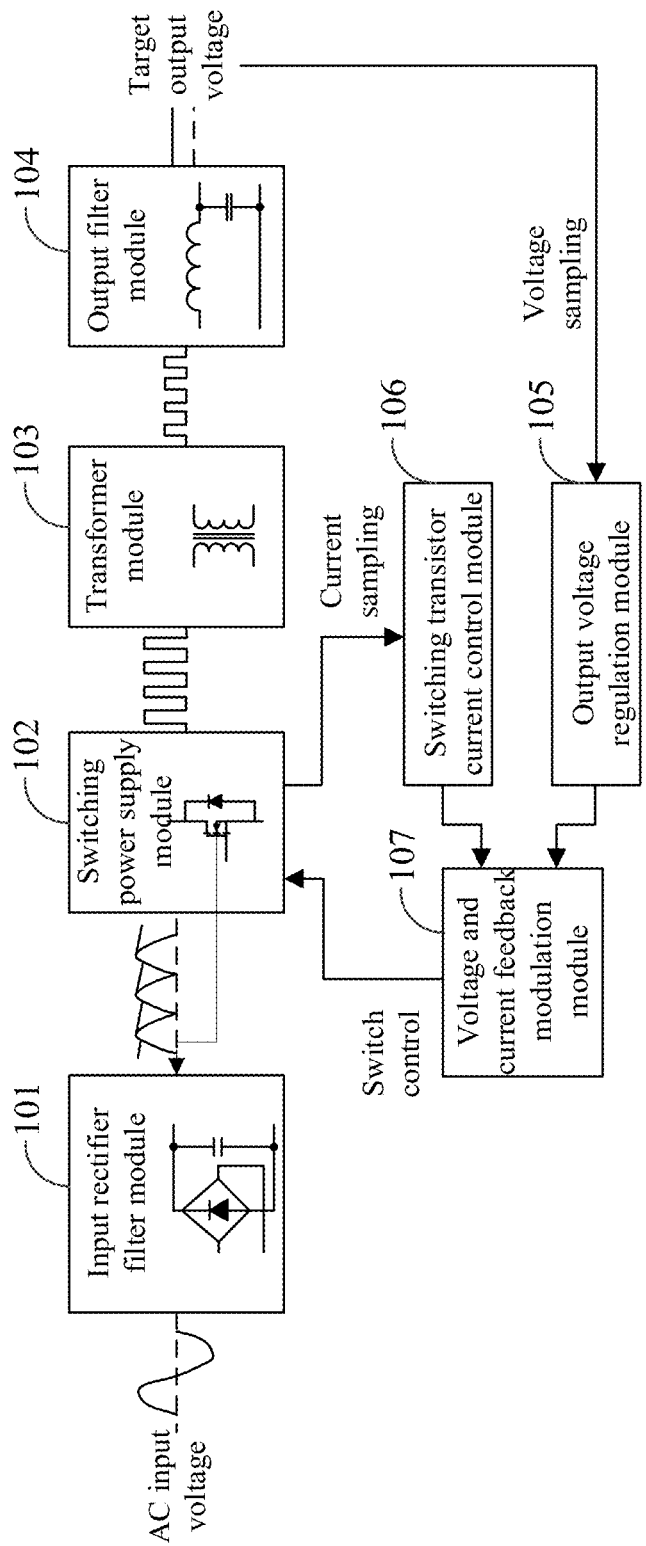
FIG. 1 illustrates a schematic diagram of working principle of a power supply adapter in a related art.

In a first aspect, an embodiment of the disclosure provides a power supply, including a rectifier circuit and a valley-fill circuit. The rectifier circuit is configured to perform voltage conversion on an input alternating current (AC) voltage to obtain a first pulsating direct current (DC) voltage. The valley-fill circuit includes at least one energy storage capacitor. The valley-fill circuit is configured to store energy through the at least one energy storage capacitor when the first pulsating DC voltage output by the rectifier circuit is in a first preset range and provide energy through the at least one energy storage capacitor when the first pulsating DC voltage output by the rectifier circuit is lower than a preset threshold, to thereby increase a valley voltage of the first pulsating DC voltage.

In some embodiments, the power supply further includes a first stage conversion circuit and a second stage conversion circuit.

The first stage conversion circuit is connected to the rectifier circuit and is configured to perform voltage conversion on the first pulsating DC voltage to obtain a second pulsating DC voltage.

The second stage conversion circuit is connected to the first stage conversion circuit and is configured to perform voltage conversion on the second pulsating DC voltage to obtain a stabilized target DC voltage.

In some embodiments, the valley-fill circuit further includes a control switch. An end of the at least one energy storage capacitor is connected to an end of the control switch, another end of the at least one energy storage capacitor is connected to a positive output end of the rectifier circuit, and another end of the control switch is connected to a negative output end of the rectifier circuit.

In some embodiments, the valley-fill circuit is configured to receive a control signal and adjust the first pulsating DC voltage by controlling turned-on and turned-off states of the control switch based on the control signal, to increase the valley voltage of the first pulsating DC voltage.

In some embodiments, the valley-fill circuit is specifically configured to control the control switch to be at a turned-on state when detecting that the first pulsating DC voltage rises to a lower limit value of the first preset range, so as to store energy through the at least one energy storage capacitor; control the control switch to be at a turned-off state when detecting that the first pulsating DC voltage rises to an upper limit value of the first preset range, so as to maintain the energy of the at least one energy storage capacitor; and control the control switch to be at the turned-on state when detecting that the first pulsating DC voltage drops to the preset threshold, so as to provide the energy through the at least one energy storage capacitor to thereby increase the valley voltage of the first pulsating DC voltage.

In some embodiments, the first stage conversion circuit includes at least one switching transistor, a transformer and a rectifier diode.

The first stage conversion circuit is specifically configured to perform voltage conversion on the first pulsating DC voltage by controlling a working state of the at least one switching transistor to obtain a modulated voltage; perform voltage conversion on the modulated voltage through the transformer to obtain an AC voltage to be rectified; and perform voltage conversion on the AC voltage to be rectified through the rectifier diode to obtain the second pulsating DC voltage.

In some embodiments, an operation mode of the first stage conversion circuit at least includes a full-bridge mode and a half-bridge mode.

The first stage conversion circuit is specifically configured to control the at least one switching transistor to operate in the full-bridge mode when an input AC voltage thereof meets a low-voltage preset range; and control the at least one switching transistor to operate in the half-bridge mode when the input AC voltage thereof meets a high-voltage preset range.

In some embodiments, the second stage conversion circuit includes at least one selected from the group consisting of: a boost circuit, a buck circuit, a buck-boost circuit, and a low dropout regulator (LDO) circuit.

In some embodiments, the second stage conversion circuit is specifically configured to perform boost conversion on the second pulsating DC voltage when the second pulsating DC voltage is lower than the target DC voltage to obtain the target DC voltage; perform buck conversion on the second pulsating DC voltage when the second pulsating DC voltage is higher than the target DC voltage to obtain the target DC voltage; and perform voltage stabilization conversion on the second pulsating DC voltage when the second pulsating DC voltage is equal to the target DC voltage to obtain the target DC voltage.

In some embodiments, the at least one energy storage capacitor is a multilayer ceramic capacitor.

In a second aspect, an embodiment of the disclosure provides a power supplying method, including:
  performing, by a rectifier circuit, voltage conversion on an input AC voltage to obtain a first pulsating DC voltage; and
  controlling a valley-fill circuit to store energy through at least one energy storage capacitor in response to the first pulsating DC voltage output by the rectifier circuit being in a first preset range, and to provide energy through the at least one energy storage capacitor in response to the first pulsating DC voltage output by the rectifier circuit being lower than a preset threshold thereby to increase a valley voltage of the first pulsating DC voltage; the valley-fill circuit including the at least one energy storage capacitor.

In some embodiments, the valley-fill circuit further includes a control switch, and the at least one energy storage capacitor is connected to the control switch.

The controlling a valley-fill circuit to store energy through at least one energy storage capacitor in response to the first pulsating DC voltage output by the rectifier circuit being in a first preset range includes:
  controlling, in response to detecting that the first pulsating DC voltage rises to a lower limit value of the first preset range, the control switch to be at a turned-on state to store the energy through the at least one energy storage capacitor;
  controlling, in response to detecting that the first pulsating DC voltage rises to an upper limit value of the first preset range, the control switch to be at a turned-off state to maintain energy of the at least one energy storage capacitor.

In some embodiments, the controlling the valley-fill circuit to provide energy through the at least one energy storage capacitor in response to the first pulsating DC voltage output by the rectifier circuit being lower than a preset threshold includes:
  controlling, in response to detecting that the first pulsating DC voltage drops to the preset threshold, the control switch to be at the turned-on state to provide energy through the at least one energy storage capacitor.

In some embodiments, the method further includes:
  receiving a control signal;
  controlling, in response to a level value of the control signal meeting a first level value, the control switch to be at the turned-on state;
  controlling, in response to the level value of the control signal meeting a second level value, the control switch to be at the turned-off state.

In some embodiments, the power supply further includes a first stage conversion circuit. After the first pulsating DC voltage is obtained, the method further includes:
  controlling the first stage conversion circuit to perform voltage conversion on the first pulsating DC voltage to obtain a second pulsating DC voltage.

In some embodiments, the first stage conversion circuit includes at least one switching transistor, a transformer and a rectifier diode. The controlling the first stage conversion circuit to perform voltage conversion on the first pulsating DC voltage to obtain a second pulsating DC voltage includes:
  performing voltage conversion on the first pulsating DC voltage by controlling a working state of the at least one switching transistor to obtain a modulated voltage;

performing voltage conversion on the modulated voltage through the transformer to obtain an AC voltage to be rectified; and performing voltage conversion on the AC voltage to be rectified through the rectifier diode to obtain the second pulsating DC voltage.

In some embodiments, the power supply further includes a second stage conversion circuit. After the second pulsating DC voltage is obtained, the method further includes:

controlling the second stage conversion circuit to perform voltage conversion on the second pulsating DC voltage to obtain a stabilized target DC voltage.

In some embodiments, the controlling the second stage conversion circuit to perform voltage conversion on the second pulsating DC voltage to obtain a stabilized target DC voltage includes:

performing, in response to the second pulsating DC voltage being lower than the target DC voltage, boost conversion on the second pulsating DC voltage to obtain the target DC voltage;

performing, in response to the second pulsating DC voltage being higher than the target DC voltage, buck conversion on the second pulsating DC voltage to obtain the target DC voltage;

performing, in response to the second pulsating DC voltage being equal to the target DC voltage, voltage stabilization conversion on the second pulsating DC voltage to obtain the target DC voltage.

In some embodiments, the second stage conversion circuit includes at least one selected from the group consisting of: a boost circuit, a buck circuit, a buck-boost circuit, and a LDO circuit.

In a third aspect, an embodiment of the disclosure provides a computer storage medium, the computer storage medium is stored with a computer program, and the computer program is configured to, when is executed, implement any one of the methods described in the second aspect.

The technical solutions in the embodiments of the disclosure will be described clearly and completely with reference to the accompanying drawings in the embodiments of the disclosure. It should be understood that the specific embodiments described herein are merely used for explaining the disclosure, rather than limiting the disclosure. In addition, it should be noted that, for the convenience of description, only parts related to the disclosure are shown in the accompanying drawings.

As the application functions of a mobile terminal (such as a smart phone, a notebook computer, a tablet computer, a personal digital assistant, a wearable device, etc.) are continuously enhanced, the mobile terminal is increasingly favored by consumers. However, the power consumption of the mobile terminal is large, and a power supply device (such as a power supply adapter) is often required to charge the mobile terminal, so as to meet the requirement of use at any time and any place and for a long time. In this way, in order to facilitate the portability of people, the size of the power supply adapter needs to be reduced as much as possible.

It should be noted that, in order to be compatible with the low-voltage power grid system (rated voltage is 110 Volt alternating current abbreviated as Vac) and the common power grid system (rated voltage is 220 Vac), the power supply adapter generally selects an electrolytic capacitor with large capacitance and high withstand voltage for filtering, so that the output voltage of the power supply adapter is a stabilized DC voltage. FIG. 1 illustrates a schematic diagram of working principle of a power supply adapter in a related art. As shown in FIG. 1, an AC input voltage is first rectified and filtered by an input rectifier filter module 101 to obtain a rectified voltage in the shape of steamed bread wave (also referred to as half-wave rectified wave), and then subjected to voltage conversion isolation by a switching power supply module 102 and a transformer module 103 to obtain a DC voltage with small pulsation. The DC voltage passes through an output filter module 104 to obtain a target output voltage, which is a final DC output. In this process, for the switching power supply module 102, voltage feedback modulation and current feedback modulation may also be performed. For voltage sampling of the target output voltage, voltage control may be performed by an output voltage regulation module 105. For current sampling of the switching transistor in the switching power supply module 102, current control may be performed by a switching transistor current control module 106. Then, the switching transistor in the switching power supply module 102 is controlled by a voltage and current feedback modulation module 107.

Thus, in the power supply adapter shown in FIG. 1, the input rectifier filter module 101 includes a rectifier bridge and an energy storage capacitor. After receiving the AC input voltage provided by the power grid, the AC input voltage is rectified by the rectifier bridge and then converted into a pulsating DC voltage, and it further needs to be filtered by the energy storage capacitor to obtain a DC voltage with small fluctuation. The energy storage capacitor plays a role of storing energy by itself when the AC input voltage is relatively low to achieve of function of maintaining a stable output voltage. However, due to the energy storage capacitor is usually an electrolytic capacitor with a relatively large capacity usually has a relatively large volume, which is not conducive to the realization of compact and lightweight design of the power supply adapter.

Based on this, an embodiment of the disclosure provides a power supply, may include a rectifier circuit and a valley-fill circuit. The rectifier circuit is used to convert an input AC voltage to obtain a first pulsating DC voltage. The valley-fill circuit includes at least one energy storage capacitor. The valley-fill circuit is used to store energy through the at least one energy storage capacitor when the first pulsating DC voltage output by the rectifier circuit is in a first preset range, and provide energy through the at least one energy storage capacitor when the first pulsating DC voltage output by the rectifier circuit is lower than a preset threshold, to thereby increase a valley voltage of the first pulsating DC voltage. In this way, the stability of output voltage can be ensured by using a capacitor valley filling technology. Moreover, due to the controlled discharge of the at least one energy storage capacitor, the energy storage capacity of the capacitor is fully utilized, and the circuit is simple, and the reliability is high; and meanwhile, the size of the power supply can be reduced, and the compact and lightweight design of the power supply can be realized.

The embodiments of the disclosure will be described in detail below with reference to the accompanying drawings.

Figure 2:
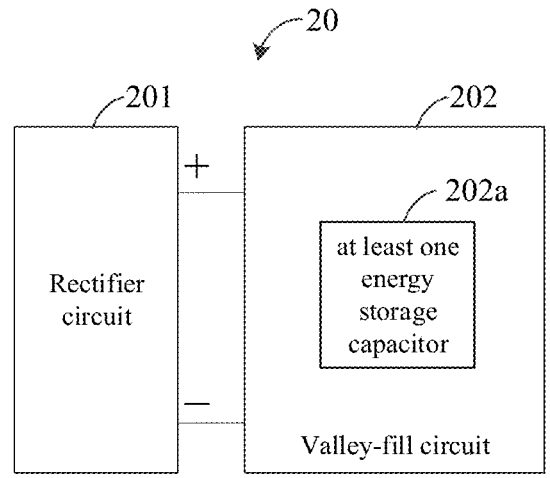
FIG. 2 illustrates a schematic diagram of a circuit structure of a power supply according to an embodiment of the disclosure.

In an embodiment of the disclosure, FIG. 2 illustrates a schematic diagram of a circuit structure of a power supply according to the embodiment of the disclosure. As shown in FIG. 2, the power supply 20 may include a rectifier circuit 201 and a valley-fill circuit 202. The valley-fill circuit 202 may include at least one energy storage capacitor 202a.

Specifically, the rectifier circuit 201 is used to convert an input AC voltage to obtain a first pulsating DC voltage.

The valley-fill circuit 202 is used to store energy through the at least one energy storage capacitor 202a when the first pulsating DC voltage output by the rectifier circuit 201 is in a first preset range, and provide energy through the at least one energy storage capacitor 202a when the first pulsating DC voltage output by the rectifier circuit 201 is lower than a preset threshold, to thereby increase a valley voltage of the first pulsating DC voltage.

It should be noted that the power supply 20 may be integrated into a power supply device such as a power supply adapter and a mobile power supply or may be used as a power supply device alone.

It should also be noted that the rectifier circuit 201 is a circuit for converting AC power into DC power, and specifically, the function of the rectifier circuit is to convert the AC power into unidirectional pulsating DC power. In other words, the voltage after passing through the rectifier circuit 201 is no longer an AC voltage, but a mixed voltage including a DC voltage and an AC voltage, which is accustomed to being referred to as the unidirectional pulsating DC voltage, that is, the first pulsating DC voltage according to the embodiment of the disclosure.

In the embodiment of the disclosure, the rectifier circuit 201 may include a rectifier bridge. Specifically, the rectifier bridge may be divided into a full-bridge rectifier bridge (also referred to as full-bridge rectifier) and a half-bridge rectifier bridge (also referred to as half-bridge rectifier). Here, the full-bridge rectifier is encapsulated by four rectifier diodes through bridge connection, and the half-bridge rectifier is encapsulated by two rectifier diodes through bridge connection, and the two half-bridge rectifiers can be combined into one full-bridge rectifier. In other words, the rectifier circuit 201 is composed of rectifier diodes.

Figure 3:
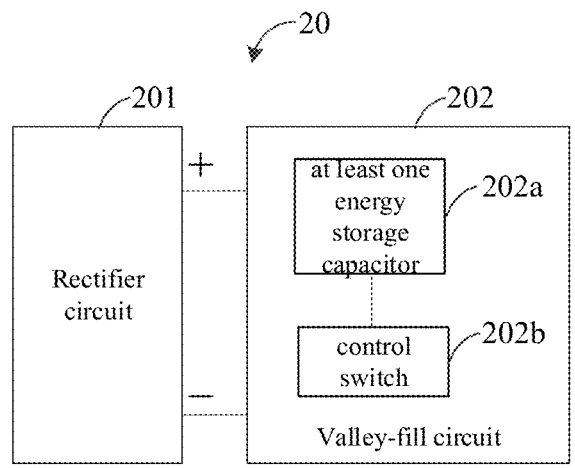
FIG. 3 illustrates a schematic diagram of a circuit structure of another power supply according to an embodiment of the disclosure.

In some embodiments, on the basis of the power supply 20 shown in FIG. 2, the valley-fill circuit 202 may further include a control switch 202b as shown in FIG. 3.

An end of the at least one energy storage capacitor 202a is connected to an end of the control switch 202b, the other end of the at least one energy storage capacitor 202a is connected to a positive output end of the rectifier circuit 201, and the other end of the control switch 202b is connected to a negative output end of the rectifier circuit 201.

That is, in the embodiment of the disclosure, the valley-fill circuit 202 may be composed of the at least one energy storage capacitor 202a and the control switch 202b, and the at least one energy storage capacitor 202a is connected to the control switch 202b. In this way, according to turned-on and turned-off states of the control switch 202b, whether the at least one energy storage capacitor 202a is switched into the power supply 20 may be controlled. Specifically, in the embodiment of the disclosure, the at least one energy storage capacitor 202a may be switched into the power supply 20 when the first pulsating DC voltage is at a voltage trough. Since the cut-in voltage is controllable, the capacitor energy storage capacity of the at least one energy storage capacitor 202a is fully utilized, so that sufficient energy support can be provided for the post-stage conversion circuit, and the stability of the output voltage is ensured.

In some embodiments, for the control switch 202b, in addition to one end connected to the at least one energy storage capacitor 202a and the other end connected to the negative output end of the rectifier circuit 201, the control switch 202b may further include a control terminal.

The control terminal is used to receive a control signal, and the control signal is used to control the turned-on and turned-off states of the control switch 202b.

It should be noted that the control terminal may be connected to a control circuit (not shown in the figure). Here, the control circuit may provide a control signal for controlling the turned-on and turned-off states of the control switch 202b. Specifically, when a level value of the control signal provided by the control circuit meets a first level value, the control switch 202b may be controlled to be at the turned-on state; and when the level value of the control signal provided by the control circuit meets a second level value, the control switch 202b may be controlled to be at a turned-off state.

It should also be noted that the first level value is different from the second level value. Here, the first level value may be a high level, and the second level value may be a low level. Alternatively, the first level value may be a low level, and the second level value may be a high level. In addition, in general, the value of the high level may be 1 or meet a level range of the high level. The value of the low level may be 0 or meet a level range of the low level. In the embodiment of the disclosure, the first level value may be set as the high level (e.g., 1), and the first level value may be set as the low level (e.g., 0), but is not specifically limited herein.

In some embodiments, the valley-fill circuit 202 is used to receive the control signal and adjust the first pulsating DC voltage based on the control signal by controlling the turned-on and turned-off states of the control switch 202b, to increase the valley voltage of the first pulsating DC voltage.

It should be noted that the input of rectifier circuit 201 is an AC voltage, and the first pulse DC voltage may be obtained after voltage conversion of the input AC voltage through the rectifier circuit 201. Here, the output end of the rectifier circuit 201 is connected to the valley-fill circuit 202. The turned-on and turned-off states of the control switch 202b may be controlled by receiving the control signal from the control terminal of the control switch 202b. The first pulsating DC voltage may be adjusted according to the turned-on and turned-off states of the control switch 202b to increase the valley voltage of the first pulsating DC voltage.

In some embodiments, the valley-fill circuit 202 is specifically used to control the control switch at the turned-on state when detecting that the first pulsating DC voltage rises to a lower limit value of a first preset range, so as to store energy through the at least one energy storage capacitor; control the control switch to be at the turned-off state when detecting that the first pulsating DC voltage rises to an upper limit value of the first preset range, so as to maintain energy of the at least one energy storage capacitor; and control the control switch to be at the turned-on state when detecting that the first pulsating DC voltage drops to the preset threshold, so as to provide energy through the at least one energy storage capacitor to thereby increase the valley voltage of the first pulsating DC voltage.

It should be noted that the first preset range includes two end points: the lower limit value and the upper limit value. The upper limit value may be expressed as a voltage value corresponding to the at least one energy storage capacitor 202a at the switch-out time, and generally, the upper limit value is a peak value of the steamed bread wave in the first pulsating DC voltage. The lower limit value may be expressed as a voltage value corresponding to the at least one energy storage capacitor 202a at the charging time, the lower limit value is in a rising stage of the steamed bread wave in the first pulsating DC voltage, and the lower limit value is lower than the upper limit value.

In addition, the preset threshold may be expressed as a voltage value corresponding to the at least one energy storage capacitor 202a at the switch-in time, and the preset threshold is in a decline stage of the steamed bread wave in the first pulsating DC voltage. Here, the preset threshold is lower than the upper limit value, but the preset threshold and the lower limit value may be set the same or different.

Specifically, in the embodiment of the disclosure, the switch-in time (i.e., preset threshold) of the at least one energy storage capacitor 202a may be determined first. Such switch-in time may be adjusted according to actual needs, but the premise is to ensure that the input voltage of the post-stage conversion circuit is not lower than its undervoltage threshold, otherwise, the post-stage conversion circuit will be shut down and the target DC voltage cannot be obtained. For the lower limit value, when the energy of the at least one energy storage capacitor 202a is lower than a certain value, it is necessary to enter the charging time to charge and store energy for the at least one energy storage capacitor 202a. For the upper limit value, the at least one energy storage capacitor 202a needs to be switched out before the steamed bread wave in the first pulsating DC voltage reaches the peak.

That is to say, in order to ensure that the final output of the power supply 20 is a constant DC voltage, the control switch 202b may be turned on at the rising stage of the steamed bread wave in the first pulsating DC voltage (i.e., the output voltage of the rectifier circuit 201), such as when it rises to the lower limit value of the first preset range, so as to charge and store energy through the at least one energy storage capacitor 202a. Then when the first pulsating DC voltage reaches the upper limit value (e.g., wave peak value) of the first preset range, the control switch 202b is turned off to maintain the energy of the at least one energy storage capacitor 202a, that is, the voltage of the at least one energy storage capacitor 202a is maintained. When the first pulsating DC voltage drops to the preset threshold, the control switch 202b is turned on to put the at least one energy storage capacitor 202a into the circuit to provide energy, so that the valley voltage of the first pulsating DC voltage can be increased to maintain the stability of the output voltage.

In some embodiments, the at least one energy storage capacitor 202a may include one energy storage capacitor, two energy storage capacitors, or three or more energy storage capacitors. Here, when the at least one energy storage capacitor 202a includes at least two energy storage capacitors, the at least two energy storage capacitors are connected in parallel.

In some embodiments, at least one energy storage capacitor 202a is a multilayer ceramic capacitor (MLCC).

It should be noted that the at least one energy storage capacitor 202a may be an electrolytic capacitor. However, in order to reduce the size, in the embodiment of the disclosure, the at least one energy storage capacitor 202a may be a small-size MLCC, a tantalum capacitor, etc., but is not specifically limited herein.

That is to say, for the valley-fill circuit 202, the number, specification and type of the energy storage capacitors used in the actual circuit should be optimized and selected according to specific needs, and the embodiments of the disclosure are not specifically limited.

It should also be noted that the control switch 202b may be a metal-oxide-semiconductor field-effect transistor (MOSFET), referred to as an MOS transistor for short; or an insulated gate bipolar transistor (IGBT); or may be a thyristor, referred to as a silicon controlled rectifier; or even other equivalent electronic switching devices. In the embodiment of the disclosure, when the at least one energy storage capacitor 202a is switched in, the control switch 202b needs to bear a large impact current and has a large loss, and at this time, a thyristor and other high-current stress devices may usually be selected to solve the problem of insufficient current stress. In this situation, since the switching frequency of the control switch 202b is very low, the switching loss of the control switch 202b substantially has no effect on the overall efficiency of the power supply 20.

This embodiment provides the power supply, which includes the rectifier circuit and the valley-fill circuit. The rectifier circuit is used to convert the input AC voltage to obtain the first pulsating DC voltage. The valley-fill circuit includes the at least one energy storage capacitor. The valley-fill circuit is used to store energy through the at least one energy storage capacitor when the first pulsating DC voltage output by the rectifier circuit is in the first preset range, and provide the energy when the first pulsating DC voltage output by the rectifier circuit is lower than the preset threshold, so as to increase the valley voltage of the first pulsating DC voltage. In this way, the stability of output voltage can be ensured by using the capacitor valley filling technology. Moreover, due to the controlled discharge of the at least one energy storage capacitor, the energy storage capacity of the capacitor is fully utilized, the circuit is simple, and the reliability is relatively high; and meanwhile, the size of the power supply can be reduced, which is beneficial to realize the compact and lightweight design of the power supply.

Figure 4:
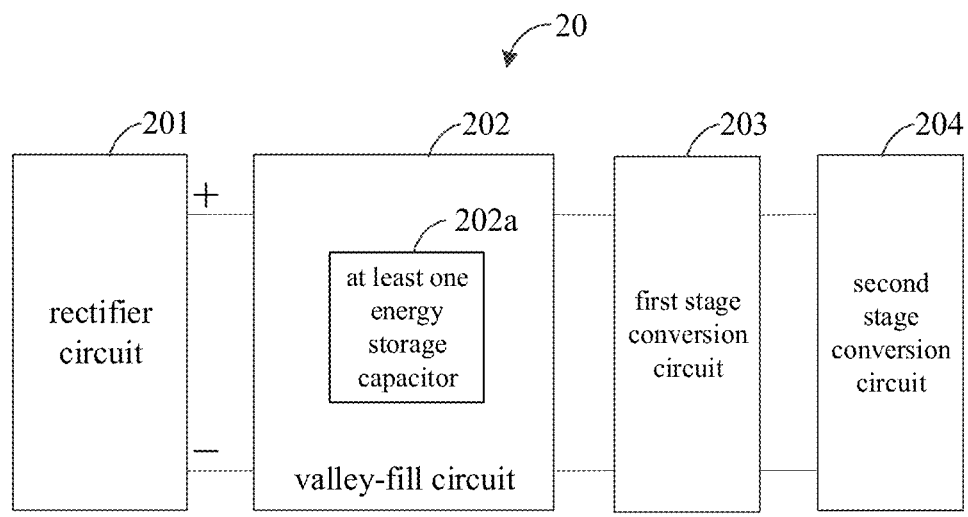
FIG. 4 illustrates a schematic diagram of a circuit structure of still another power supply according to an embodiment of the disclosure.

In another embodiment of the disclosure, FIG. 4 illustrates a schematic diagram of a circuit structure of still another power supply according to an embodiment of the disclosure. As shown in FIG. 4, on the basis of the power supply 20 shown in FIG. 2, the power supply 20 may further include a first stage conversion circuit 203 and a second stage conversion circuit 204.

The first stage conversion circuit 203 is connected to the rectifier circuit 201 and is used to convert the first pulsating DC voltage to obtain a second pulsating DC voltage.

The second stage conversion circuit 204 is connected to the first stage conversion circuit 203 and is used to convert the second pulsating DC voltage to obtain a stable target DC voltage.

Here, the first stage conversion circuit 203 may include at least one switching transistor, a transformer, and a rectifier diode. Thus, in some embodiments, the first stage conversion circuit 203 may be used to convert the first pulsating DC voltage by controlling a working state of the at least one switching transistor to obtain a modulated voltage; convert the modulated voltage through the transformer to obtain an AC voltage to be rectified; and convert the AC voltage to be rectified through the rectifier diode to obtain the second pulsating DC voltage.

It should be noted that an operation mode of the first stage conversion circuit 203 at least includes a full-bridge mode and a half-bridge mode. Thus, in some embodiments, the first stage conversion circuit 203 is specifically used to control the at least one switching transistor to operate in the full-bridge mode when the input AC voltage meets a low-voltage preset range; and control the at least one switching transistor to operate in the half-bridge mode when the input AC voltage meets a high-voltage preset range. Here, the low-voltage preset range may be set to 90 Vac~130 Vac, and the high-voltage preset range may be set to 180 Vac~264 Vac, but the embodiment of the disclosure is not specifically limited.

It should also be noted that the voltage conversion herein may be either boost conversion or buck conversion. In addition, the operation mode of the first stage conversion circuit 203 is not limited to the full-bridge mode and the half-bridge mode, the first stage conversion circuit 203 may be a switching power supply circuit in other operation modes, and as long as the required voltage conversion is achieved, the embodiment of the disclosure is not specifically limited.

In some embodiments, the second stage conversion circuit 204 includes at least one selected from the group consisting of a boost circuit, a buck circuit, a buck-boost circuit, and a low dropout regulator (LDO) circuit.

In some embodiments, the second stage conversion circuit 204 is specifically used to perform boost conversion on the second pulsating DC voltage to obtain the target DC voltage when the second pulsating DC voltage is lower than the target DC voltage; perform buck conversion on the second pulsating DC voltage to obtain the target DC voltage when the second pulsating DC voltage is higher than the target DC voltage; perform voltage stabilization conversion on the second pulsating DC voltage to obtain the target DC voltage when the second pulsating DC voltage is equal to the target DC voltage.

That is to say, when the second pulsating DC voltage is lower than the target DC voltage, the second stage conversion circuit 204 may be a boost circuit to perform the boost conversion on the second pulsating DC voltage to obtain the target DC voltage. When the second pulsating DC voltage is higher than the target DC voltage, the second stage conversion circuit 204 may be a buck circuit to perform the buck conversion on the second pulsating DC voltage to obtain the target DC voltage. When the second pulsating DC voltage is equal to the target DC voltage, the second stage conversion circuit 204 may be an LDO circuit to perform the voltage stabilization conversion on the second pulsating DC voltage to obtain the target DC voltage. In addition, even the second stage conversion circuit 204 may also be a buck-boost circuit to convert the DC voltage higher than, lower than or equal to the target DC voltage into a stable target DC voltage output.

In the embodiment of the disclosure, in order to provide the stable target DC voltage output and achieve a high-efficiency and small-size design, the power supply 20 may adopt a two-stage circuit architecture. The first stage is the first stage conversion circuit 203 for converting the high-voltage pulsating DC voltage into the low-voltage pulsating DC voltage output; and the second stage is the second stage conversion circuit 204 for converting the low-voltage pulsating DC voltage into the stable target DC voltage output. It should be noted that for the capacitor valley filling technology of the valley-fill circuit 202, the power supply 20 may also be applied to the single-stage circuit. For example, after the first pulsating DC voltage, there may only be the first stage conversion circuit 203 or only the second stage conversion circuit 204, and the embodiment of the disclosure is not specifically limited.

Figure 5:
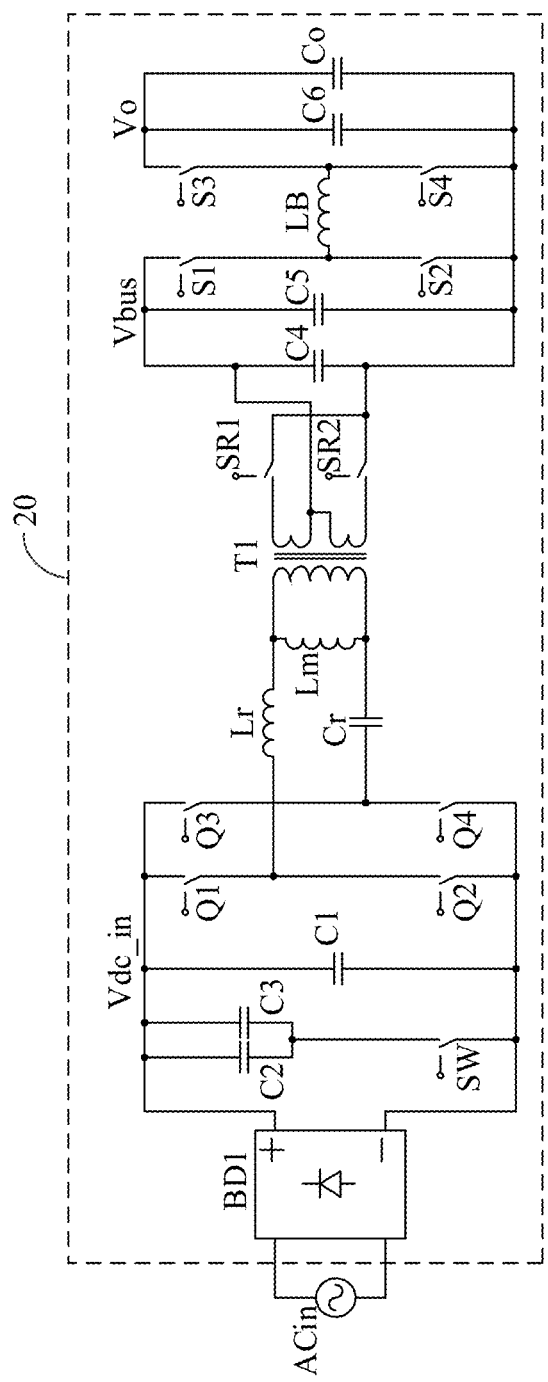
FIG. 5 illustrates a schematic diagram of a detailed hardware circuit of a power supply according to an embodiment of the disclosure.

For example, FIG. 5 illustrates a schematic diagram of a detailed hardware circuit of the power supply 20 according to an embodiment of the disclosure. As shown in FIG. 5, the power supply 20 may include a rectifier circuit BD1, a first capacitor C1, a second capacitor C2, a third capacitor C3, a control switch SW, a first switching transistor Q1, a second switching transistor Q2, a third switching transistor Q3, a fourth switching transistor Q4, a resonant inductor Lr, an excitation inductor Lm, a resonant capacitor Cr, a transformer T1, a fifth switching transistor SR1, a sixth switching transistor SR2, a fourth capacitor C4, a fifth capacitor C5, a seventh switching transistor S1, an eighth switching transistor S2, a ninth switching transistor S3, a tenth switching transistor S4, a conversion inductor LB, a sixth capacitor C6 and an output capacitor Co.

In FIG. 5, the second capacitor C2, the third capacitor C3 and the control switch SW form the valley-fill circuit. The first switching transistor Q1, the second switching transistor Q2, the third switching transistor Q3, the fourth switching transistor Q4, the resonant inductor Lr, the excitation inductor Lm, the resonant capacitor Cr, the transformer T1, the fifth switching transistor SR1, the sixth switching transistor SR2, the fourth capacitor C4, and the fifth capacitor C5 form the first stage conversion circuit. The seventh switching transistor S1, the eighth switching transistor S2, the ninth switching transistor S3, the tenth switching transistor S4, the conversion inductor LB, the sixth capacitor C6 and the output capacitor Co form the second stage conversion circuit. As seen from FIG. 5, the second capacitor C2 and the third capacitor C3 are connected in parallel to form parallel-connected capacitors, and the parallel-connected capacitors and the control switch SW are connected in series between a positive output end (+) and a negative output end (−) of the rectifier circuit BD1. The first switching transistor Q1, the second switching transistor Q2, the third switching transistor Q3, the fourth switching transistor Q4, the resonant inductor Lr, the excitation inductor Lm and the resonant capacitor Cr are all electrically connected to a primary side of the transformer T1. The fifth switching transistor SR1, the sixth switching transistor SR2, the fourth capacitor C4 and the fifth capacitor C5 are all electrically connected to a secondary side of the transformer T1.

In other words, in order to provide stable voltage output and achieve high-efficiency and ultra-small-size design, the power supply 20 may adopt a two-stage circuit architecture. Here, the first stage conversion circuit (DCX, which may be equivalent to a DC transformer) is used to receive a high-voltage pulsating DC voltage (expressed by Vdc_in) output by the rectifier circuit BD1 (which may include a diode bridge stack, or called a rectifier bridge) and then convert the high-voltage pulsating DC voltage into a low-voltage pulsating output voltage (expressed by Vbus). Since the first stage conversion circuit can operate at the optimal point, the DCX can achieve extremely high conversion efficiency. The DCX circuit range is from "Vdc_in" to "Vbus" as shown in FIG. 5.

Here, the first stage conversion circuit is an LLC resonant circuit. When the switching frequency of an LLC resonant converter is constant and equal to the resonant frequency, the DC voltage gain of the LLC resonant converter remains unchanged and can be equivalent to a DC transformer, that is, LLC-DCX or referred to as an DC transformer based on an LLC resonant converter.

Specifically, the switching transistors Q1-Q4 form a switch network, Lr is the resonant inductor, which can be realized by using the leakage inductance of the transformer T1 to reduce the number of components, and Lm is the excitation inductor of the transformer T1. Cr is the resonant capacitor, which has two functions: (1) a blocking function to avoid saturation of the transformer T1; (2) a function of participating in resonance. The LLC resonant circuit can make the switching device in a soft-switching state through the resonance of Lr, Lm and Cr, so as to achieve extremely high-efficiency power conversion. Here, the switching transistors SR1 and SR2 are used to realize synchronous rectification, in other words, the switching transistors SR1 and SR2 together constitute a synchronous rectification circuit; and may also be replaced by rectifier diodes.

More specifically, in FIG. 5, when the AC voltage provided by an AC power supply ACin is in the low-voltage range (such as 90 Vac~130 Vac), the first stage conversion circuit DCX can operate in the full-bridge mode, and at this time, the four switching transistors in the DCX operate, and the fixed voltage gain is Z1. In the same application scenario, when the AC voltage provided by the AC power supply ACin is in the high-voltage range (such as 180 Vac~264 Vac), the first stage conversion circuit DCX can operate in the half-bridge mode, with a fixed voltage gain such as Z2. In the embodiment of the disclosure, Z1 is required to be greater than Z2. Because the AC power supply with lower voltage obtains the high gain (i.e., the gain of Z1) supported by the full-bridge mode, the voltage range output by the first stage conversion circuit DCX can finally be controlled in a relatively narrow range.

In addition, the second stage conversion circuit is a DC/DC circuit, which is used to convert the low-voltage pulsating DC voltage output by DCX into a stable DC voltage output and provide it to the load. In FIG. 5, the second stage conversion circuit adopts a buck-boost circuit, which can convert the Vbus higher than, lower than or equal to the target DC voltage to the stable target DC voltage (expressed by Vo). Here, the buck-boost circuit range is from "Vbus" to "Vo" as shown in FIG. 5.

Specifically, when Vbus is higher than Vo, the second stage conversion circuit operates in a buck mode, S3 is always at a turned-on state, S4 is always at a turned-off state, and S1 and S2 are switched at high frequency; at this time, Vbus is chopped at high frequency, and then filtered through a filter composed of LB, C6 and Co to finally output a stable target DC voltage. When Vbus is lower than Vo, the second stage conversion circuit operates in a boost mode, S1 is always at a turned-on state, S2 is always at a turned-off state, and S3 and S4 are switched at high frequency; at this time, the stable target DC voltage is finally output through the filter composed of LB, C6 and Co.

It should be noted that the specific topological structures used in the first stage and second stage conversion circuits in the embodiment of the disclosure are only schematic, and does not limit the application scope of the embodiments of the disclosure. For example, the first stage conversion circuit may also be realized using other DCX forms, and the second stage conversion circuit may also be realized using other DC/DC circuit topologies.

In the embodiment of the disclosure, the two-stage circuit architecture shown in FIG. 5 may use few MLCC capacitors to replace the electrolytic capacitors in the relevant technical solutions, so that the size of the power supply can be reduced, and the reliability and service life can be improved. In addition, DCX can adopt the operation mode of full-bridge/half-bridge switching. When the input AC voltage is in the low-voltage range, DCX operates in the full-bridge mode; when the input AC voltage is in the high-voltage range, DCX operates in the half-bridge mode, so that the output change range of the DCX can be maintained in a narrow range when the input AC voltage is in a wide range, which is convenient for optimizing the design of the post-stage buck-boost circuit. However, whether the DCX adopts the full-bridge mode/half-bridge mode does not affect the implementation of the valley-fill circuit technology in the embodiment of the disclosure.

That is to say, in order to solve the problem that the input pulse of DCX is too large and Vo is difficult to stabilize after the capacitor is reduced, an auxiliary valley-fill circuit may be added at this situation. In the embodiment of the disclosure, the valley-fill circuit may be composed of the second capacitor C2, the third capacitor C3 and the control switch SW. Its working principle is as follows.

In order to ensure that the final output of the power supply is constant DC, in the rising stage of the steamed bread wave in the first pulsating DC voltage (i.e., output voltage of BD1), such as when it rises to the lower limit value of the first preset range, the control switch SW is turned-on, and the second capacitor C2 and the third capacitor C3 are charged to store energy. After the first pulsating DC voltage reaches the upper limit value (e.g., wave peak value) of the first preset range, the control switch SW is turned off, and the second capacitor C2 and the third capacitor C3 maintain the voltage. When the steamed bread wave in the first pulsating DC voltage drops to a certain set value (e.g., preset threshold), the control switch SW is turned-on, and the second capacitor C2 and the third capacitor C3 are put into the circuit to provide energy for the first capacitor C1, so as to improve the valley voltage of AC rectification and maintain the stability of Vo.

In a specific embodiment, it is assumed that the input AC voltage is 90 Vac, the DCX is in the full-bridge operation mode, and the DCX input valley voltage is very low and close to 0V, resulting in the output Vo cannot be stabilized. However, after increasing capacitor switching of the valley-fill circuit, the Vo can be stabilized by adjusting the MLCC parameters (e.g., the capacitance value of MLCC capacitor), and the simulation waveforms are shown in FIG. 6.

Figure 6:
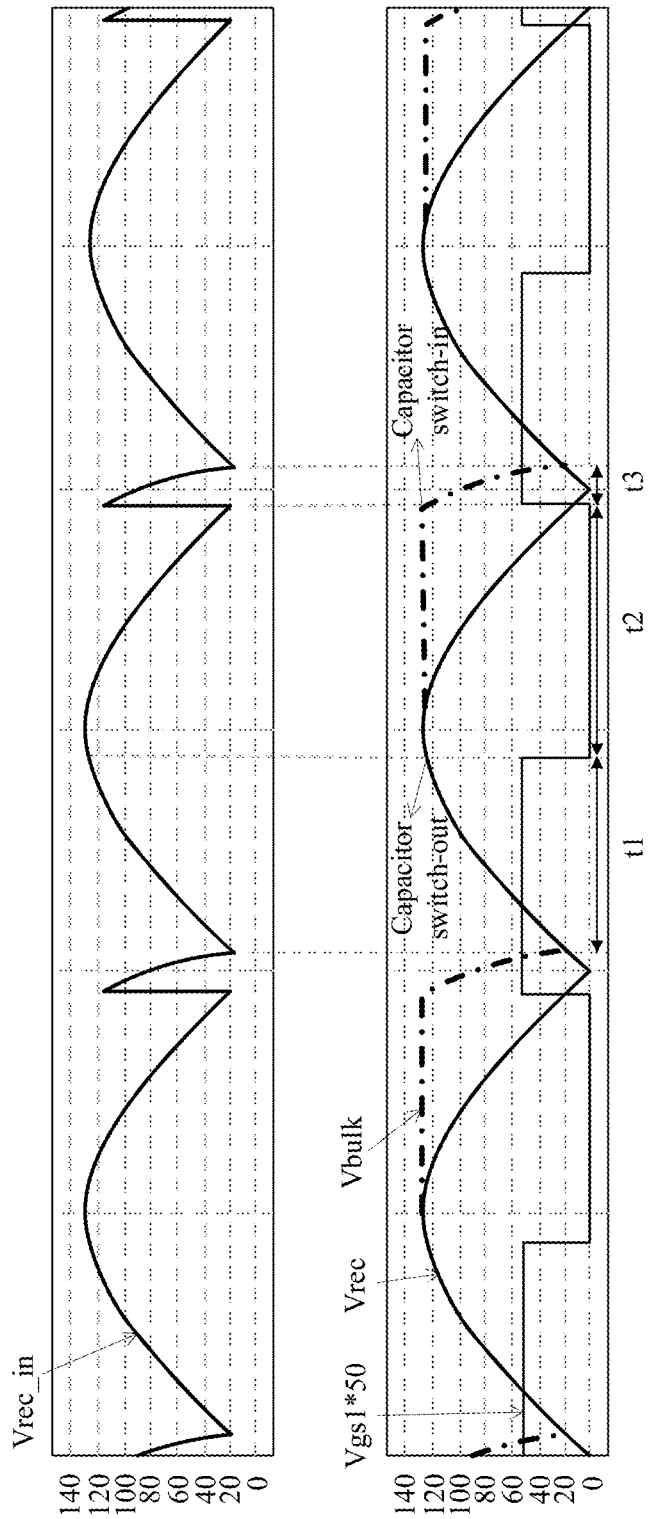
FIG. 6 illustrates a schematic diagram of simulation waveforms of a first pulsating DC voltage before and after adding a valley-fill circuit according to an embodiment of the disclosure.

FIG. 6 illustrates a schematic diagram of simulation waveforms of a first pulsating DC voltage before and after adding a valley-fill circuit according to the embodiment of the disclosure. As shown in FIG. 6, Vrec is the first pulsating DC voltage before adding the valley-fill circuit, that is, the AC rectified voltage without the valley-fill circuit; Vrec-in is the first pulsating DC voltage after adding the valley-fill circuit, that is, the AC rectified voltage after adding the valley-fill circuit, that is, the bus voltage of the first capacitor C1; Vbulk is the bus voltage on the second capacitor C2 and the third capacitor C3, and Vgsl*50 is the control signal of the control switch SW. In this way, it can be seen from FIG. 6 that during the time period t1, the control switch SW is turned-on, and the second capacitor C2 and the third capacitor C3 are charged for energy storage. During the time period t2, when the steamed bread wave in the first pulsating DC voltage reaches the peak, the control switch SW is turned off, and the second capacitor C2 and the third capacitor C3 are switched out, so that the second capacitor C2 and the third capacitor C3 maintain the voltage (i.e., maintain the energy). During the time period t3, when the steamed bread wave in the first pulsating DC voltage drops to the preset threshold, the control switch SW is turned-on, and the second capacitor C2 and the third capacitor C3 are put into the circuit to charge the first capacitor C1, the valley voltage of Vrec-in can be improved, so that the output stability can be maintained.

In short, the electrolytic capacitor is not used in the technical solution of the embodiment of the disclosure, thereby reducing the size of the power supply. However, due to the lack of large-capacity energy storage capacitor, a stable output voltage cannot be maintained when the AC input reaches the valley. At this time, by adopting the capacitor switching technology (i.e., capacitor valley filling technology) in the embodiment of the disclosure, the energy stored in the capacitors C2 and C3 at the peak of AC input can be used to provide sufficient power support for the back-end circuit when the AC input reaches the valley, so as to ensure the stability of the output voltage.

In addition, the valley-fill circuit can store energy by using the MLCC capacitors (which may also be high-voltage ceramic chip capacitors or other high-density capacitors), so that energy storage can be performed by using a smaller capacitance to the greatest extent. Since the newly added devices such as C2, C3 and SW may all be controlled in a small size, in general, the embodiment of the disclosure can significantly improve the overall power density of the power supply adapter.

Figure 7:
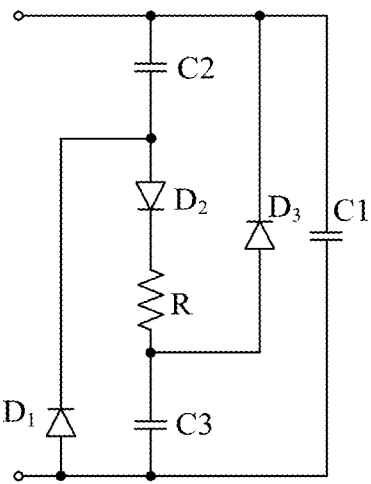
FIG. 7 illustrates a schematic diagram of a detail hardware circuit of a valley-fill circuit in a related art.
Figure 8:
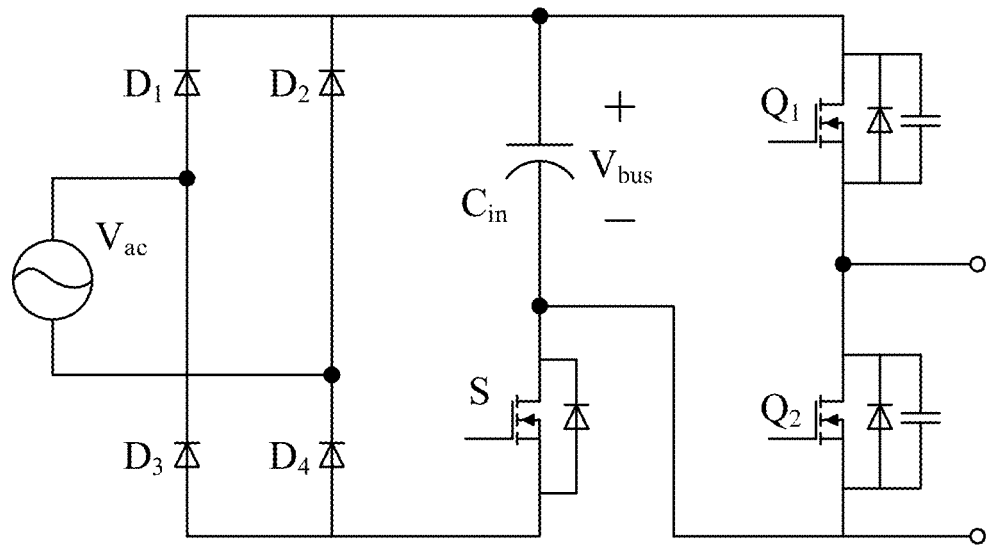
FIG. 8 illustrates a schematic diagram of a detail hardware circuit of another valley-fill circuit in a related art.

In related art, FIG. 7 illustrates a schematic diagram of a detail hardware circuit of a valley-fill circuit. As shown in FIG. 7, the valley-fill circuit may include a first diode $D_1$, a second diode $D_2$, a third diode $D_3$, a second capacitor C2 and a third capacitor C3, while the first capacitor C1 is mainly used for energy storage filtering. Although the structure of the valley-fill circuit is simple and does not need to be controlled, the utilization rate of the capacitors is low due to the uncontrollable cut-in voltage. FIG. 8 illustrates a schematic diagram of a detail hardware circuit of another valley-fill circuit in a related art. As shown in FIG. 8, the valley-fill circuit may include a capacitor $C_{in}$ and a switching transistor S, and the turned-on and turned-off states of the switching transistor S may control whether the capacitor $C_{in}$ is charged for energy storage. Although the capacitor of the valley-fill circuit is controlled to charge, the input voltage is adjustable, and the capacitor size is small, however, the power supply adapter still needs a large electrolytic capacitor, the active control efficiency requirement is high, and the reliability is low.

In this way, compared with the valley-fill circuits shown in FIG. 7 and FIG. 8, in the valley-fill circuit in the embodiment of the disclosure, on the one hand, the capacitor may be a non-electrolytic capacitor, that is, a small-size capacitor may be selected; on the other hand, the capacitor is discharged in a controlled manner (valley cut-in discharge and controllable cut-in voltage), so that the energy storage capacity of the capacitor is fully utilized, the circuit is simple, and the reliability is relatively high. The disadvantage of the embodiment of the disclosure is that when the capacitor is switched in, the control switch needs to bear a large impact current and has a large loss, and at this time, a high-current stress device such as a thyristor can be selected to solve the problem of insufficient current stress. In this situation, since the switching frequency of the control switch is very low, the switching loss substantially has no effect on the overall efficiency of the circuit.

In addition, according to the output protocol requirements of the power supply adapter, the second stage conversion circuit (e.g., the buck-boost circuit) also receives instructions such as the charging voltage and the charging current given by the protocol chip, and adjusts the output voltage, the output current, the output power, and the like according to the instructions. Since these functions are similar to the implementation of other power supply adapters, it will not be described in detail herein.

It should be noted that, although the power supply with valley filling technology proposed in the embodiment of the disclosure is described by the two-stage circuit architecture shown in FIG. 5, it can also be applied to a single-stage circuit. In addition, the power supply may be a power supply adapter or an AC/DC power supply in other fields.

Through the above embodiments, the specific implementation of the above embodiments is described in detail. It can be seen that the stability of the output voltage can be ensured by using the capacitor valley filling technology. Moreover, due to the controlled discharge of the at least one energy storage capacitor, the energy storage capacity of the capacitor is fully utilized, the circuit is simple, and the reliability is relatively high. In this situation, the power supply can be applied to the power supply adapter, so that the size of the power supply adapter can be reduced, and it is conducive to realizing the compact and lightweight design of the power supply adapter.

Figure 9:
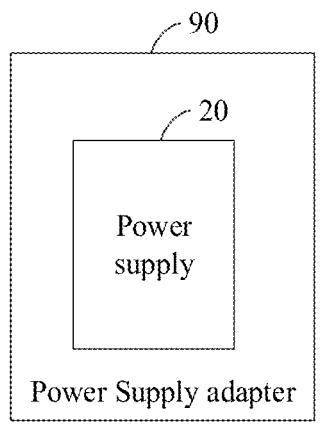
FIG. 9 illustrates a schematic structural diagram of a power supply adapter in a related art.

In another embodiment of the disclosure, FIG. 9 illustrates a schematic structural diagram of a power supply adapter according to the embodiment of the disclosure. As shown in FIG. 9, the power supply adapter 90 may include the power supply 20 described in any of the preceding embodiments.

In the embodiment of the disclosure, the power supply adapter 90 includes the power supply 20, and the power supply 20 includes a valley-fill circuit composed of at least one energy storage capacitor. In this way, the stability of output voltage can be ensured by using the capacitor valley filling technology. Moreover, due to the controlled discharge of the at least one energy storage capacitor, the energy storage capacity of the capacitor is fully utilized, the circuit is simple, and the reliability is relatively high. In this situation, the size of the power supply adapter can be reduced, and it is beneficial to realize the compact and lightweight design of the power supply adapter.

Figure 10:
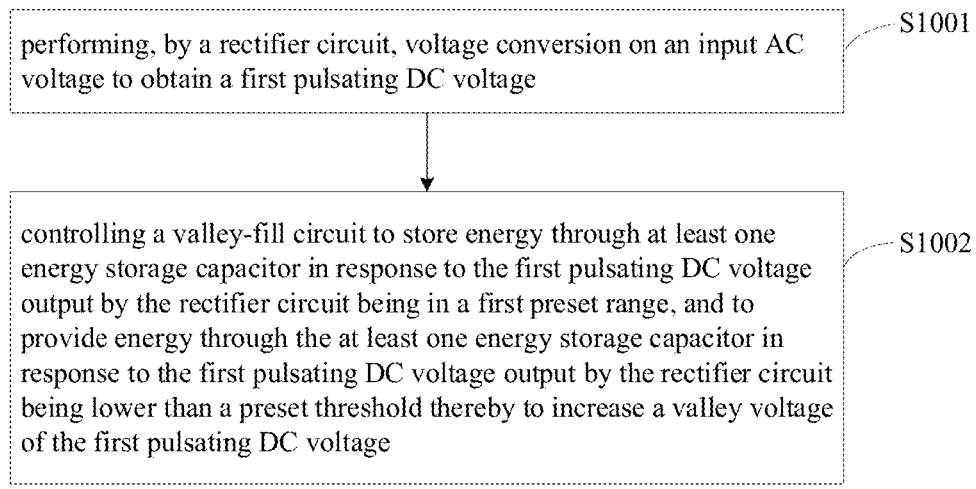
FIG. 10 illustrates a schematic flowchart of a power supplying method according to an embodiment of the disclosure.

In still another embodiment of the disclosure, FIG. 10 illustrates a schematic flowchart of a power supplying method according to the embodiment of the disclosure. As shown in FIG. 10, the method may include a block S1001 and a block S1002 as follows.

At the block S1001: performing, by a rectifier circuit, voltage conversion on an input AC voltage to obtain a first pulsating DC voltage.

It should be noted that the power supplying method can be applied to the power supply 20 described in any of the preceding embodiments, or the power supply adapter, or other power supply equipment integrated with the power supply 20. According to the power supplying method, the stability of output voltage can be ensured.

It should also be noted that the rectifier circuit may include a rectifier bridge, or may also be composed of four rectifier diodes, specifically refers to a circuit that converts AC power into DC power. In addition, the voltage after passing through the rectifier circuit is no longer an AC voltage, but a mixed voltage containing an DC voltage and an AC voltage, which is accustomed to being referred to as the unidirectional pulsating DC voltage, that is, the first pulsating DC voltage described in the embodiment of the disclosure.

At the block S1002: controlling a valley-fill circuit to store energy through at least one energy storage capacitor in response to the first pulsating DC voltage output by the rectifier circuit being in a first preset range, and to provide energy through the at least one energy storage capacitor in response to the first pulsating DC voltage output by the rectifier circuit being lower than a preset threshold thereby to increase a valley voltage of the first pulsating DC voltage.

It should be noted that the power supply may include the rectifier circuit and the valley-fill circuit, while the valley-fill circuit includes the at least one energy storage capacitor. In this way, the at least one energy storage capacitor can be switched into the power supply when the first pulsating DC voltage is at the voltage valley in the embodiment of the disclosure, so that the capacitor energy storage capability of the at least one energy storage capacitor is fully utilized, sufficient energy support can be provided for the post-stage conversion circuit, and the stability of the output voltage is ensured.

It should also be noted that the valley-fill circuit may further include a control switch, that is, the valley-fill circuit may be composed of the at least one energy storage capacitor and the control switch, and the at least one energy storage capacitor is connected to the control switch. Specifically, in the power supply, one end of the at least one energy storage capacitor is connected to one end of the control switch, the other end of the at least one energy storage capacitor is connected to a positive output end of the rectifier circuit, and the other end of the control switch is connected to a negative output end of the rectifier circuit.

It can be understood that the control switch may further include a control terminal, and the control terminal is connected to a control circuit to receive a control signal to control turned-on and turned-off states of the control switch according to the control signal. In some embodiments, the method may further include:

receiving a control signal;
controlling, in response to a level value of the control signal meeting a first level value, the control switch to be at the turned-on state;
controlling, in response to the level value of the control signal meeting a second level value, the control switch to be at the turned-off state.

It should be noted that the first level value is different from the second level value. Here, the first level value may be a high level, and the second level value may be a low level. Alternatively, the first level value may be a low level and the second level value may be a high level. In the embodiment of the disclosure, the first level value may be set as the high level (such as 1), and the first level value may be set as the low level (such as 0), but is not specifically limited herein.

It should also be noted that, according to the turned-on and turned-off states of the control switch, whether the at least one energy storage capacitor is switched into the power supply can be controlled, so that the first pulsating DC voltage can be adjusted to increase the valley voltage of the first pulsating DC voltage.

In some embodiments, for the block S1002, the controlling the valley-fill circuit to store energy through at least one energy storage capacitor when the first pulsating DC voltage output by the rectifier circuit is in a first preset range may include:

controlling, in response to detecting that the first pulsating DC voltage rises to a lower limit value of the first preset range, the control switch to be in a turned-on state to store the energy through the at least one energy storage capacitor;
controlling, in response to detecting that the first pulsating DC voltage rises to an upper limit value of the first preset range, the control switch to be at a turned-off state to maintain the energy of the at least one energy storage capacitor.

In some embodiments, the controlling the valley-fill circuit to provide energy through the at least one energy storage capacitor in response to the first pulsating DC voltage output by the rectifier circuit being lower than a preset threshold may include:

controlling, in response to detecting that the first pulsating DC voltage drops to the preset threshold, the control switch to be at the turned-on state to provide energy through the at least one energy storage capacitor.

It should be noted that the first preset range includes two end points: the lower limit value and the upper limit value. The upper limit value may be expressed as a voltage value corresponding to the at least one energy storage capacitor at the switch-out time, and generally, the upper limit value is a peak value of the steamed bread wave in the first pulsating DC voltage. The lower limit value may be expressed as a voltage value corresponding to the at least one energy storage capacitor at the charging time, the lower limit value is in a rising stage of the steamed bread wave in the first pulsating DC voltage. The preset threshold may be expressed as a voltage value corresponding to the at least one energy storage capacitor at the switch-in time. The preset threshold is in a decline stage of the steamed bread wave in the first pulsating DC voltage. Here, the preset threshold is lower than the upper limit value, but the preset threshold and the lower limit value may be set the same or different, and the embodiment of the disclosure is not specifically limited.

That is to say, in order to ensure that the final output of the power supply is a constant DC voltage, the control switch is turned-on at the rising stage of the steamed bread wave in the first pulsating DC voltage (i.e., the output voltage of the rectifier circuit), such as when it rises to the lower limit value of the first preset range, so as to charge and store energy through the at least one energy storage capacitor. Then when the first pulsating DC voltage reaches the upper limit value (e.g., wave peak value) of the first preset range, the control switch is turned off to maintain the energy of the at least one energy storage capacitor, that is, the voltage of the at least one energy storage capacitor is maintained. When the first pulsating DC voltage drops to the preset threshold, the control switch is turned-on to put the at least one energy storage capacitor into the circuit to provide energy, so that the valley voltage of the first pulsating DC voltage can be increased to maintain the stability of the output voltage.

It can be understood that after the first pulsating DC voltage is obtained, the first pulsating DC voltage may also be performed with voltage conversion. In other words, the power supply may further include a first stage conversion circuit. In some embodiments, after the first pulsating DC voltage is obtained, the method may further include:

controlling the first stage conversion circuit to perform voltage conversion on the first pulsating DC voltage to obtain a second pulsating DC voltage.

Specifically, the first stage conversion circuit may include at least one switching transistor, a transformer and a rectifier diode. In this way, in some embodiments, the controlling the first stage conversion circuit to perform voltage conversion on the first pulsating DC voltage to obtain a second pulsating DC voltage includes:

performing voltage conversion on the first pulsating DC voltage by controlling a working state of the at least one switching transistor to obtain a modulated voltage;
performing voltage conversion on the modulated voltage through the transformer to obtain an AC voltage to be rectified; and
performing voltage conversion on the AC voltage to be rectified through the rectifier diode to obtain the second pulsating DC voltage.

It should be noted that an operation mode of the first stage conversion circuit may at least include a full-bridge mode and a half-bridge mode. Specifically, when the input AC voltage meets the low-voltage preset range, the at least one switching transistor is controlled to operate in the full-bridge mode; and when the input AC voltage meets the high-voltage preset range, the at least one switching transistor is controlled to operate in the half-bridge mode.

Here, the low voltage preset range may be set to 90 Vac~130 Vac, and the high-voltage preset range may be set to 180 Vac~264 Vac, but the embodiment of the disclosure is not specifically limited. Since the operation mode of the first stage conversion circuit may at least include the full-bridge mode and the half-bridge mode, the first stage conversion circuit can operate in the full-bridge mode to obtain the second pulsating DC voltage when the input AC voltage meets 90 Vac~130 Vac; and when the input AC voltage meets 180 Vac~264 Vac, the first stage conversion circuit can operate in the half-bridge mode to obtain the second pulsating DC voltage.

It should also be noted that the operation mode of the first stage conversion circuit is not limited to the full-bridge mode and half-bridge mode, or may be a switching power supply circuit in other operation modes, and as long as the required voltage conversion is achieved, the embodiment of the disclosure is not specifically limited.

In some embodiments, the power supply may further include a second stage conversion circuit for performing voltage conversion on the second pulsating DC voltage to obtain a stabilized target DC voltage. Therefore, in some embodiments, the method may further include:

controlling the second stage conversion circuit to perform voltage conversion on the second pulsating DC voltage to obtain the stabilized target DC voltage.

It should be noted that the second stage conversion circuit includes at least one selected from the group consisting of a boost circuit, a buck circuit, a buck-boost circuit and a LDO circuit.

In some embodiments, the controlling the second stage conversion circuit to perform voltage conversion on the second pulsating DC voltage to obtain a stabilized target DC voltage may include:

performing, in response to the second pulsating DC voltage being lower than the target DC voltage, boost conversion on the second pulsating DC voltage to obtain the target DC voltage;

performing, in response to the second pulsating DC voltage being higher than the target DC voltage, buck conversion on the second pulsating DC voltage to obtain the target DC voltage;

performing, in response to the second pulsating DC voltage being equal to the target DC voltage, voltage stabilization conversion on the second pulsating DC voltage to obtain the target DC voltage.

That is to say, when the second pulsating DC voltage is lower than the target DC voltage, the second stage conversion circuit may be a boost circuit to perform the boost conversion on the second pulsating DC voltage to obtain the target DC voltage. When the second pulsating DC voltage is higher than the target DC voltage, the second stage conversion circuit may be a buck circuit to perform the buck conversion on the second pulsating DC voltage to obtain the target DC voltage. When the second pulsating DC voltage is equal to the target DC voltage, the second stage conversion circuit may be an LDO circuit to perform the voltage stabilization conversion on the second pulsating DC voltage to obtain the target DC voltage. In addition, even the second stage conversion circuit may also be a buck-boost circuit to convert the DC voltage higher than, lower than or equal to the target DC voltage into a stable target DC voltage output.

In the embodiment of the disclosure, in order to provide the stable target DC voltage output and achieve a high-efficiency and small-size design, the power supply can adopt a two-stage circuit architecture. The first stage is the first stage conversion circuit for converting the high-voltage pulsating DC voltage into the low-voltage pulsating DC voltage output, and the second stage is the second stage conversion circuit for converting the low-voltage pulsating DC voltage into the stable target DC voltage output. It should be noted that for the capacitor valley filling technology of the valley-fill circuit, the power supply may also be applied to the single-stage circuit. For example, after the first pulsating DC voltage, there can be only the first stage conversion circuit or only the second stage conversion circuit, and the embodiment of the disclosure is not specifically limited.

The embodiment provides the power supplying method, which is applied to the power supply. The first pulsating DC voltage is obtained by converting the input AC voltage through the rectifier circuit; the valley-fill circuit is controlled to store energy through the at least one energy storage capacitor when the first pulsating DC voltage output by the rectifier circuit is in the first preset range, and provide the energy through the at least one energy storage capacitor when the first pulsating DC voltage output by the rectifier circuit is lower than the preset threshold, so as to increase the valley voltage of the first pulsating DC voltage. The valley-fill circuit includes the at least one energy storage capacitor. In this way, by adopting the capacitor valley filling technology, the obtained target rectified voltage can ensure the stability of the output voltage; moreover, due to the controlled discharge of the at least one energy storage capacitor, the capacitor energy storage capacity is fully utilized, the circuit is simple, and the reliability is relatively high; meanwhile, the size of the power supply can be reduced, and the small and lightweight design of the power supply can be realized.

It can be understood that the power supply 20 of the embodiment of the disclosure can be an integrated circuit chip with signal processing capability. In the process of implementation, the steps of the above method embodiment may be completed by combining an integrated logic circuit of hardware in the power supply 20 with instructions in the form of software. Based on this understanding, some functions of the technical solution of the disclosure may be embodied in the form of a software product. Therefore, the embodiment provides a computer storage medium, which stores a computer program, and when the computer program is executed, the steps of the power supplying method described in the preceding embodiment are implemented.

Those skilled in the art can realize that units and algorithm steps of the examples described in combination with the embodiments disclosed in the disclosure can be realized by electronic hardware, or a combination of computer software and electronic hardware. Whether these functions are implemented by hardware or software depends on the specific application and design constraints of the technical solution. A person skilled in the art may use different methods to implement the described functions for each particular application, but it should not be considered that the implementation goes beyond the scope of the disclosure.

It can be clearly understood by those skilled in the art that, for the convenience and brevity of description, the specific working process of the system, device and unit described above can refer to the corresponding process in the above method embodiment, which will not be repeated herein.

It should be noted that in the disclosure, the terms "comprising", "including" or any other variation thereof are intended to cover a non-exclusive inclusion, so that a process, a method, an article or a device including a series of elements not only includes those elements, but also other elements not explicitly listed, or elements inherent to such a process, method, article, or apparatus. Without further limitations, the element defined by the statement "including a . . . " does not exclude the existence of another identical element in the process, method, article or device that includes the element.

The above serial number of the embodiments of the disclosure is merely for description and does not represent advantages and disadvantages of the embodiments.

The method disclosed in several method embodiments of the disclosure may be arbitrarily combined to obtain a new method embodiment without conflict.

The features disclosed in several product embodiments of the disclosure may be arbitrarily combined to obtain a new product embodiment without conflict.

The features disclosed in several method or device embodiments of the disclosure may be arbitrarily combined to obtain a new method embodiment or a new device embodiment without conflict.

The above is merely the specific embodiments of the disclosure, but the scope of protection of the disclosure is not limited thereto, and any person skilled in the art may easily conceive of changes or substitutions within the technical scope disclosed in the disclosure, which shall be covered by the scope of protection of the disclosure. Therefore, the scope of protection of the disclosure shall be subject to the scope of protection of the claims.

INDUSTRIAL APPLICABILITY

In the embodiment of the disclosure, the power supply may include the rectifier circuit and the valley-fill circuit. The rectifier circuit is used for voltage conversion of the input AC voltage to obtain the first pulsating DC voltage. The valley-fill circuit includes the at least one energy storage capacitor. The valley-fill circuit is used to store energy through the at least one energy storage capacitor when the first pulsating DC voltage output by the rectifier circuit is in the first preset range, and provide the energy through the at least one energy storage capacitor when the first pulsating DC voltage output by the rectifier circuit is lower than the preset threshold, so as to increase the valley voltage of the first pulsating DC voltage. In this way, the stability of output voltage can be ensured by using the capacitor valley filling technology. Moreover, due to the controlled discharge of the at least one energy storage capacitor, the energy storage capacity of the capacitor is fully utilized, the circuit is simple, and the reliability is high; and meanwhile, the size of the power supply can be reduced, and the compact and lightweight design of the power supply can be realized.

What is claimed is:

1. A power supply, comprising:
    a rectifier circuit, configured to perform voltage conversion on an input alternating current (AC) voltage to obtain a first pulsating direct current (DC) voltage;
    a valley-fill circuit, comprising at least one energy storage capacitor; wherein the valley-fill circuit is configured to: store energy through the at least one energy storage capacitor when the first pulsating DC voltage output by the rectifier circuit is in a first preset range, and provide energy through the at least one energy storage capacitor when the first pulsating DC voltage output by the rectifier circuit is lower than a preset threshold to thereby increase a valley voltage of the first pulsating DC voltage;
    wherein the valley-fill circuit further comprises a control switch; an end of the at least one energy storage capacitor is connected to an end of the control switch, another end of the at least one energy storage capacitor is connected to a positive output end of the rectifier circuit, and another end of the control switch is connected to a negative output end of the rectifier circuit; and
    wherein the valley-fill circuit is configured to:
        control, in response to detecting that the first pulsating DC voltage rises to a lower limit value of the first preset range, the control switch to be at a turned-on state to store energy through the at least one energy storage capacitor,
        control, in response to detecting that the first pulsating DC voltage rises to an upper limit value of the first preset range, the control switch to be switched from the turned-on state to a turned-off state to maintain energy of the at least one energy storage capacitor,
        control, in response to detecting that the first pulsating DC voltage drops from the upper limit value to the preset threshold, the control switch to be at the turned-on state to provide energy through the at least one energy storage capacitor to thereby increase the valley voltage of the first pulsating DC voltage.

2. The power supply according to claim 1, further comprising:
    a first stage conversion circuit, connected to the rectifier circuit and configured to perform voltage conversion on the first pulsating DC voltage to obtain a second pulsating DC voltage; and
    a second stage conversion circuit, connected to the first stage conversion circuit and configured to perform voltage conversion on the second pulsating DC voltage to obtain a stabilized target DC voltage.

3. The power supply according to claim 1, wherein the valley-fill circuit is further configured to receive a control signal and adjust the first pulsating DC voltage by controlling the turned-on and turned-off states of the control switch based on the control signal.

4. The power supply according to claim 2, wherein the first stage conversion circuit comprises at least one switching transistor, a transformer, and a rectifier diode;
    wherein the first stage conversion circuit is specifically configured to:
        perform voltage conversion on the first pulsating DC voltage by controlling a working state of the at least one switching transistor to obtain a modulated voltage,
        perform voltage conversion on the modulated voltage through the transformer to obtain an AC voltage to be rectified, and
        perform voltage conversion on the AC voltage to be rectified through the rectifier diode to obtain the second pulsating DC voltage.

5. The power supply according to claim 4, wherein an operation mode of the first stage conversion circuit at least comprises a full-bridge mode and a half-bridge mode;
    wherein the first stage conversion circuit is specifically configured to:
        control, in response to an input AC voltage thereof meeting a low-voltage preset range, the at least one switching transistor to operate in the full-bridge mode;
        control, in response to the input AC voltage thereof meeting a high-voltage preset range, the at least one switching transistor to operate in the half-bridge mode.

6. The power supply according to claim 2, wherein the second stage conversion circuit comprises at least one selected from the group consisting of a boost circuit, a buck circuit, a buck-boost circuit, and a low dropout regulator (LDO) circuit.

7. The power supply according to claim 6, wherein the second stage conversion circuit is specifically configured to:

perform, in response to the second pulsating DC voltage being lower than the target DC voltage, boost conversion on the second pulsating DC voltage to obtain the target DC voltage;
perform, in response to the second pulsating DC voltage being higher than the target DC voltage, buck conversion on the second pulsating DC voltage to obtain the target DC voltage;
perform, in response to the second pulsating DC voltage being equal to the target DC voltage, voltage stabilization conversion on the second pulsating DC voltage to obtain the target DC voltage.

8. The power supply according to claim 2, wherein the at least one energy storage capacitor comprises a plurality of parallel-connected capacitors, the valley-fill circuit further comprises a control switch, and the parallel-connected capacitors and the control switch are connected in series between a positive end and a negative output end of the rectifier circuit;
wherein the first stage conversion circuit is an inductor-inductor-capacitor (LLC) resonant circuit, the LLC resonant circuit comprises a transformer, a switch network, a resonant inductor, an excitation inductor, a resonant capacitor and a synchronous rectification circuit; the switch network, the resonant inductor, the excitation inductor and the resonant capacitor are all electrically connected to a primary side of the transformer; and the synchronous rectification circuit is electrically connected to a secondary side of the transformer; and
wherein the second stage conversion circuit is DC to DC conversion circuit.

9. A power supplying method, comprising:
performing, by a rectifier circuit of a power supply, voltage conversion on an input AC voltage to obtain a first pulsating DC voltage; and
controlling a valley-fill circuit of the power supply to store energy through at least one energy storage capacitor in response to the first pulsating DC voltage output by the rectifier circuit being in a first preset range, and to provide energy through the at least one energy storage capacitor in response to the first pulsating DC voltage output by the rectifier circuit being lower than a preset threshold thereby to increase a valley voltage of the first pulsating DC voltage; the valley-fill circuit comprising the at least one energy storage capacitor;
wherein the power supply further comprises a first stage conversion circuit and a second stage conversion circuit, after the first pulsating DC voltage is obtained, the method further comprises:
controlling the first stage conversion circuit to perform voltage conversion on the first pulsating DC voltage to obtain a second pulsating DC voltage; and
controlling the second stage conversion circuit to perform voltage conversion on the second pulsating DC voltage to obtain a stabilized target DC voltage, comprising:
performing, in response to the second pulsating DC voltage being lower than the target DC voltage, boost conversion on the second pulsating DC voltage to obtain the target DC voltage;
performing, in response to the second pulsating DC voltage being higher than the target DC voltage, buck conversion on the second pulsating DC voltage to obtain the target DC voltage;
performing, in response to the second pulsating DC voltage being equal to the target DC voltage, voltage stabilization conversion on the second pulsating DC voltage to obtain the target DC voltage.

10. The method according to claim 9, wherein the first stage conversion circuit comprises at least one switching transistor, and an operation mode of the first stage conversion circuit at least comprises a full-bridge mode and a half-bridge mode, and the method further comprises:
controlling, in response to an input AC voltage of the first stage conversion circuit meeting a low-voltage preset range, the at least one switching transistor to operate in the full-bridge mode;
controlling, in response to the input AC voltage of the first stage conversion circuit meeting a high-voltage preset range, the at least one switching transistor to operate in the half-bridge mode.

11. The method according to claim 9, wherein the valley-fill circuit further comprises a control switch, and the at least one energy storage capacitor is connected to the control switch;
wherein the controlling a valley-fill circuit to store energy through at least one energy storage capacitor in response to the first pulsating DC voltage output by the rectifier circuit being in a first preset range comprises:
controlling, in response to detecting that the first pulsating DC voltage rises to a lower limit value of the first preset range, the control switch to be at a turned-on state to store the energy through the at least one energy storage capacitor;
controlling, in response to detecting that the first pulsating DC voltage rises to an upper limit value of the first preset range, the control switch to be at a turned-off state to maintain energy of the at least one energy storage capacitor.

12. The method according to claim 11, wherein the controlling the valley-fill circuit to provide energy through the at least one energy storage capacitor in response to the first pulsating DC voltage output by the rectifier circuit being lower than a preset threshold comprises:
controlling, in response to detecting that the first pulsating DC voltage drops to the preset threshold, the control switch to be in at the turned-on state to provide energy through the at least one energy storage capacitor.

13. The method according to claim 11, further comprising:
receiving a control signal;
controlling, in response to a level value of the control signal meeting a first level value, the control switch to be at the turned-on state;
controlling, in response to the level value of the control signal meeting a second level value, the control switch to be at the turned-off state.

14. The method according to claim 9, wherein the first stage conversion circuit comprises at least one switching transistor, a transformer, and a rectifier diode;
wherein the controlling the first stage conversion circuit to perform voltage conversion on the first pulsating DC voltage to obtain a second pulsating DC voltage comprises:
performing voltage conversion on the first pulsating DC voltage by controlling a working state of the at least one switching transistor to obtain a modulated voltage;
performing voltage conversion on the modulated voltage through the transformer to obtain an AC voltage to be rectified; and performing voltage conversion on the AC voltage to be rectified through the rectifier diode to obtain the second pulsating DC voltage.

15. The method according to claim 9, wherein the second stage conversion circuit comprises at least one selected from the group consisting of a boost circuit, a buck circuit, a buck-boost circuit, and a low dropout regulator (LDO) circuit.

16. A non-transitory computer-readable storage medium having a computer program stored thereon that is configured to, when executed by a processor, implement a power supplying method, the power supplying method comprising:
  performing, by a rectifier circuit of a power supply, voltage conversion on an input AC voltage to obtain a first pulsating DC voltage; and
  storing energy through at least one energy storage capacitor of a valley-fill circuit of the power supply in response to the first pulsating DC voltage output by the rectifier circuit being in a first preset range, and supplying energy through the at least one energy storage capacitor in response to the first pulsating DC voltage output by the rectifier circuit being lower than a preset threshold thereby to increase a valley voltage of the first pulsating DC voltage;
  wherein the power supply further comprises a first stage conversion circuit configured to perform voltage conversion on the first pulsating DC voltage to obtain a second pulsating DC voltage;
  wherein the first stage conversion circuit comprises at least one switching transistor, and an operation mode of the first stage conversion circuit at least comprises a full-bridge mode and a half-bridge mode, and the method further comprises:
  controlling, in response to an input AC voltage of the first stage conversion circuit meeting a low-voltage preset range, the at least one switching transistor to operate in the full-bridge mode;
  controlling, in response to the input AC voltage of the first stage conversion circuit meeting a high-voltage preset range, the at least one switching transistor to operate in the half-bridge mode.

17. The non-transitory computer-readable storage medium according to claim 16, wherein the power supply further comprises a second stage conversion circuit, after the second pulsating DC voltage is obtained, the method further comprises:
  controlling the second stage conversion circuit to perform voltage conversion on the second pulsating DC voltage to obtain a stabilized target DC voltage.

18. The non-transitory computer-readable storage medium according to claim 17, wherein the controlling the second stage conversion circuit to perform voltage conversion on the second pulsating DC voltage to obtain a stabilized target DC voltage comprises:
  performing, in response to the second pulsating DC voltage being lower than the target DC voltage, boost conversion on the second pulsating DC voltage to obtain the target DC voltage;
  performing, in response to the second pulsating DC voltage being higher than the target DC voltage, buck conversion on the second pulsating DC voltage to obtain the target DC voltage;
  performing, in response to the second pulsating DC voltage being equal to the target DC voltage, voltage stabilization conversion on the second pulsating DC voltage to obtain the target DC voltage.

19. The non-transitory computer-readable storage medium according to claim 16, wherein the first stage conversion circuit further comprises a transformer, and a rectifier diode;
  wherein the performing, by the first stage conversion circuit, voltage conversion on the first pulsating DC voltage to obtain a second pulsating DC voltage comprises:
  performing voltage conversion on the first pulsating DC voltage by controlling a working state of the at least one switching transistor to obtain a modulated voltage;
  performing voltage conversion on the modulated voltage through the transformer to obtain an AC voltage to be rectified; and
  performing voltage conversion on the AC voltage to be rectified through the rectifier diode to obtain the second pulsating DC voltage.

20. The non-transitory computer-readable storage medium according to claim 16, wherein the at least one energy storage capacitor comprises a plurality of parallel-connected capacitors.

* * * * *